(12) United States Patent
Nakano et al.

(10) Patent No.: US 6,445,151 B1
(45) Date of Patent: *Sep. 3, 2002

(54) CONTROLLER FOR MOTOR-DRIVEN POWER STEERING MECHANISM

(75) Inventors: Jiro Nakano, Okazaki; Ichiro Nagashima, Nagoya, both of (JP)

(73) Assignee: Toyoda Koki Kabushiki Kaisha, Kariya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/539,888

(22) Filed: Mar. 31, 2000

(30) Foreign Application Priority Data

Apr. 1, 1999 (JP) .......................... 11-094718

(51) Int. Cl.[7] .................................. H02P 7/00
(52) U.S. Cl. .................. 318/434; 318/430; 318/432; 318/466; 318/265; 318/266; 318/465; 180/165; 701/41; 701/42; 701/47; 364/265; 364/266
(58) Field of Search ................. 318/430, 432, 318/434, 466; 364/265–266; 180/165; 701/22, 41, 42

(56) References Cited

U.S. PATENT DOCUMENTS

| | | | | |
|---|---|---|---|---|
| 4,869,334 A | * | 9/1989 | Marumoto et al. | 180/79.1 |
| 5,369,349 A | * | 11/1994 | Tsuchiya et al. | 318/811 |
| 5,473,539 A | * | 12/1995 | Shimizu et al. | 364/424.05 |
| 5,636,137 A | * | 6/1997 | Hazelden | 364/507.44 |
| 5,652,487 A | * | 7/1997 | Nishino et al. | 318/434 |
| 5,809,438 A | * | 9/1998 | Noro et al. | 701/41 |
| 5,889,376 A | * | 3/1999 | Takatsuka et al. | 318/434 |
| 5,894,206 A | * | 4/1999 | Noro et al. | 318/433 |
| 5,912,539 A | * | 6/1999 | Sugitani et al. | 318/434 |
| 6,013,994 A | * | 1/2000 | Endo et al. | 318/434 |
| 6,072,293 A | * | 6/2000 | Shimizu et al. | 318/432 |
| 6,078,851 A | * | 6/2000 | Sugitani | 701/34 |
| 6,091,214 A | * | 7/2000 | Yamawaki et al. | 318/52 |

FOREIGN PATENT DOCUMENTS

EP           1040983 A2  *  4/2000  ............ B62D/6/08

* cited by examiner

Primary Examiner—Robert E. Nappi
Assistant Examiner—Tyrone Smith
(74) Attorney, Agent, or Firm—Oblon, Spivak, McClelland, Maier & Neustadt, P.C.

(57) ABSTRACT

In a controller for a motor-driven power steering mechanism, a motor control section outputs to a drive circuit a control signal corresponding to a torque command output from a torque calculation section. A digital signal processor receives the control signal, calculates an average of values of the control signal during a predetermined period of time, and outputs the average to an anomalous-state monitor section. The anomalous-state monitor section counts the number of times the average deviates from an allowable range. When the number of times has reached a predetermined number, the anomalous-state monitor section judges that the controller has come into an anomalous-state, and outputs a control prohibition signal to the motor control section.

13 Claims, 7 Drawing Sheets

CONTROLLER FOR MOTOR-DRIVEN POWER STEERING MECHANISM

BACKGROUND OF THE INVENTION

1. Field of the Invention

The present invention relates to a controller for a motor-driven power steering mechanism which assists steering operation of a steering wheel by means of the drive force of an electric motor.

2. Description of the Related Art

Figure 6:
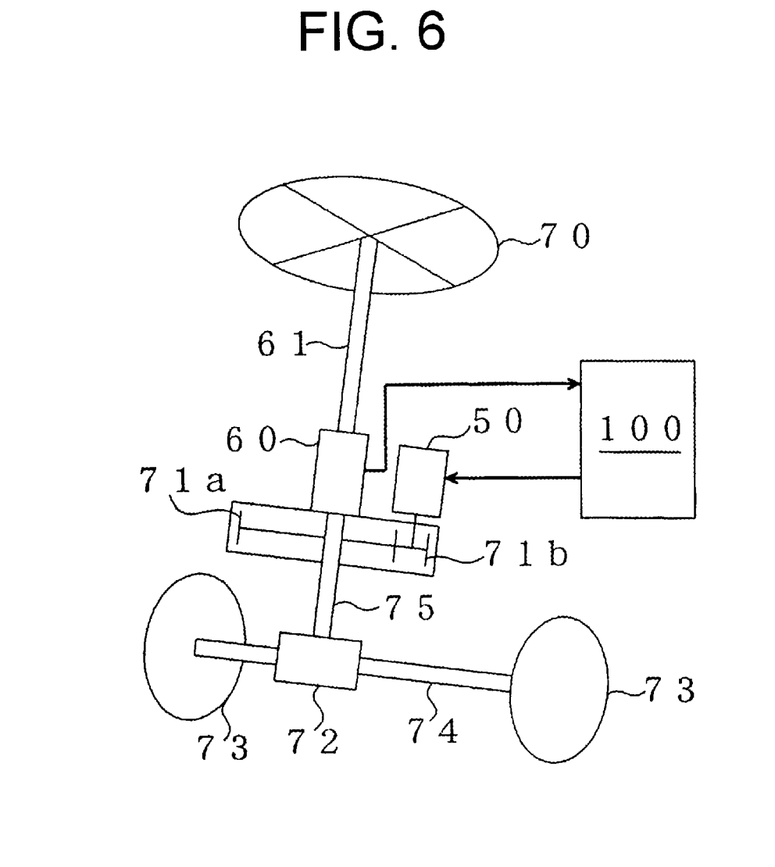
FIG. 6 is an explanatory view schematically showing the overall structure of a motor-driven power steering mechanism equipped with a dedicated controller.
Figure 7:
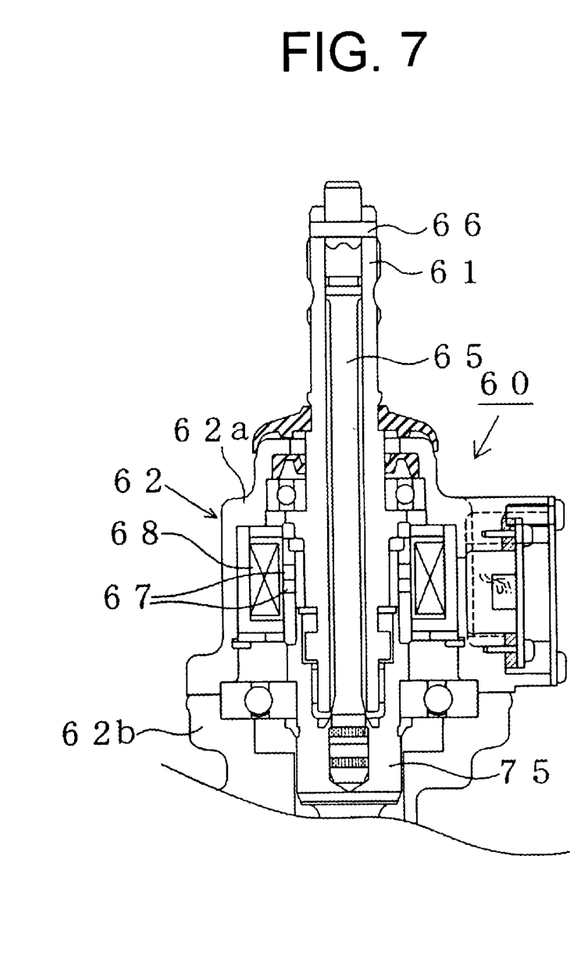
FIG. 7 is a an explanatory view showing a torque-sensing mechanism provided in the motor-driven power steering mechanism shown in FIG. 6.
Figure 8:
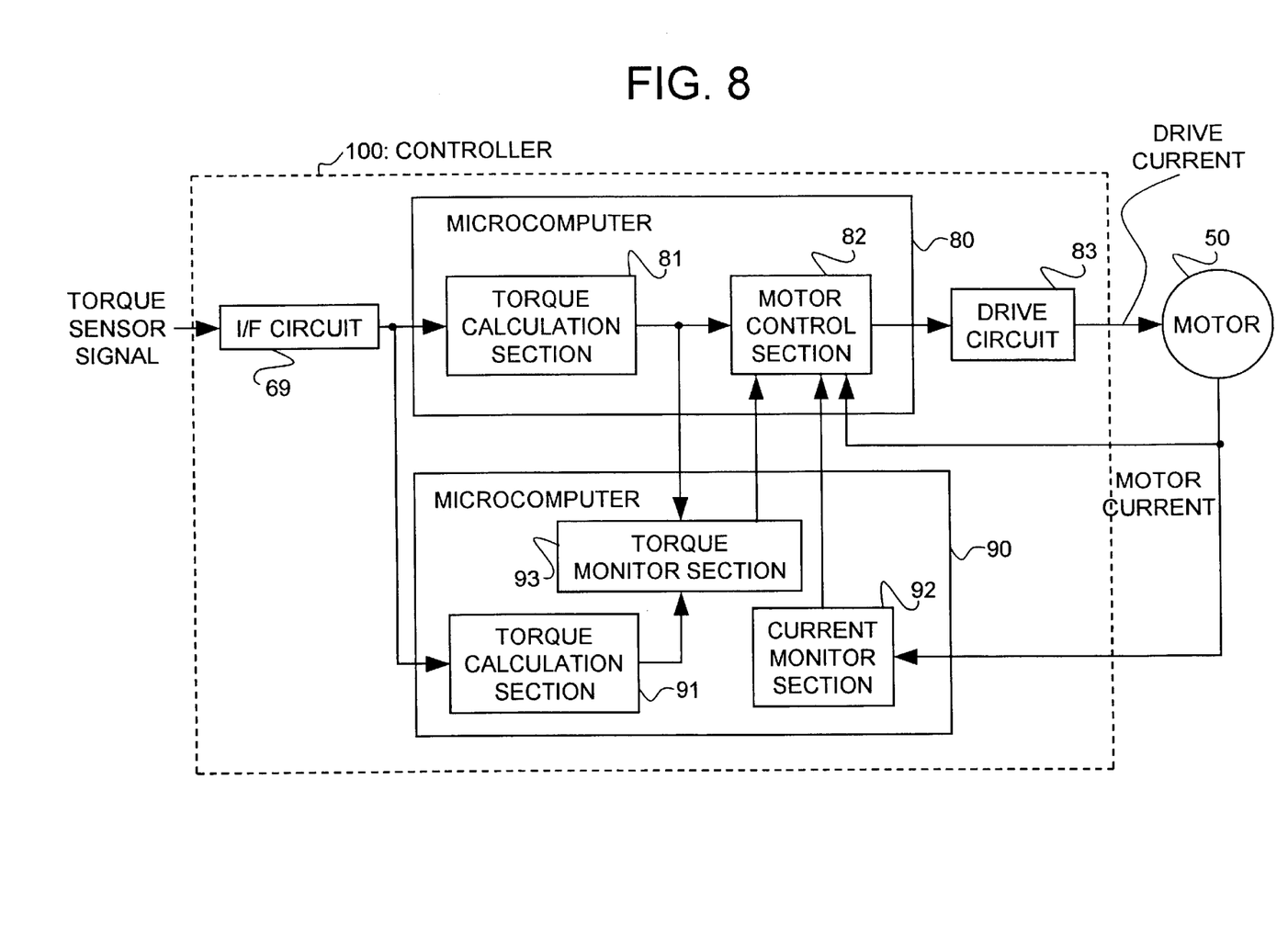
FIG. 8 is a block diagram of the conventional controller for the motor-driven power steering mechanism shown in FIG. 6.

FIGS. 6 to 8 show a typical motor-driven power steering mechanism and a conventional controller for the motor-driven power steering mechanism.

FIG. 6 is an explanatory view schematically showing the overall structure of the motor-driven power steering mechanism; FIG. 7 is a an explanatory view showing a torque-sensing mechanism provided in the motor-driven power steering mechanism shown in FIG. 6; and FIG. 8 is a block diagram of the conventional controller for the motor-driven power steering mechanism.

First, the overall structure of the motor-driven power steering mechanism will be described with reference to FIG. 6.

A steering wheel 70 is fixed to a shaft 61, which is connected to a torque-sensing mechanism 60. To the torque-sensing mechanism 60 is connected a shaft 75 having a reduction gear 71a provided thereon. The reduction gear 71a is in meshing engagement with a reduction gear 71b fixed to an output shaft of an electric motor 50. The shaft 75 is also connected to a steering gear 72. Wheels 73 to be steered are attached to the opposite ends of a rod 74, which is connected to the steering gear 72.

Next, the structure of the torque-sensing mechanism 60 will be described with reference to FIG. 7.

The torque-sensing mechanism 60 comprises the shaft 61, which is hollow and whose lower portion penetrates an upper portion 62a of a housing 62. The shaft 75 penetrates a lower portion 62b of the housing 62, and the above-described reduction gear 71a (see FIG. 6) arranged in meshing engagement with the reduction gear 71b is attached to the shaft 75.

A torsion bar 65 is accommodated within the interior of the shaft 61. The upper end of the torsion bar 65 is coupled with the shaft 61 by use of a pin 66, and the lower end of the torsion bar 65 is in spline-engagement with an inner portion of the shaft 75.

That is, the torque-sensing mechanism 60 is configured such that when a steering torque is transmitted to the shaft 61 upon operation of the steering wheel 70, the torsion bar 65 is twisted, resulting in generation of a relative displacement between the shaft 61 and the shaft 75.

Two paired sensor rings 67 formed of a magnetic material are disposed within the housing 62 to surround the shaft 61 One of the sensor rings 67 is secured to the shaft 61, and the other sensor ring 67 is secured to the shaft 75. A sensor coil 68 is provided within the housing 62 at such a position that the inner circumferential surface of the sensor coil 68 faces the outer circumferential surfaces of the sensor rings 67

When a relative displacement is produced between the shafts 61 and 75, the amount of overlap between the end surfaces of the sensor rings 67 changes, with the result that the inductance of the sensor coil 68 changes. Thus; a signal representing steering torque (hereinafter referred to as a "torque sensor signal") is obtained.

The sensor coil 68 is electrically connected to a controller 100 for the motor-driven power steering mechanism (see FIGS. 6 and 8).

Next, the electrical configuration of the controller 100 will be described with reference to FIG. 8.

The controller 100 includes an interface circuit (hereinafter referred to as an "I/F circuit") 69, which receives the torque sensor signal and converts it to a torque signal representing the steering torque. Two microcomputers; i.e., a microcomputer 80 and a microcomputer 90, are connected to the I/F circuit 69. The microcomputer 80 includes a torque calculation section 81 and a motor control section 82. The torque calculation section 81 receives the torque signal from the I/F circuit 69 and calculates the steering torque. The motor control section 82 outputs to a drive circuit 83 a control signal corresponding to the steering torque calculated by the torque calculation section 81. The drive circuit 83 supplies drive current to the electric motor 50 in accordance with the control signal output from the motor control section 82.

The microcomputer 90 includes a torque calculation section 91, which calculates the steering torque in a manner similar to that employed in the torque calculation section 81 of the microcomputer 80. The microcomputer 90 further includes a torque monitor section 93, which compares the steering torque calculated by the torque calculation section 81 of the microcomputer 80 with the steering torque calculated by the torque calculation section 91, in order to detect a difference there between. When the difference is determined to have exceeded a predetermined level one time, the torque monitor section 93 determines that the controller 100 has come into an anomalous-state. The microcomputer 90 further includes a current monitor section 92, which detects an anomalous-state of the electric motor 50 by monitoring motor current flowing through the electric motor 50.

The operation of the controller 100 will now be described.

When a steering torque is applied to the steering wheel 70 (FIG. 6), the torsion bar 65 FIGS. 7) twists, resulting in generation of a relative displacement between the shaft 61 and the shaft 75. As a result, the overlap between the end surfaces of the sensor rings 67 changes, and thus, the inductance of the sensor coil 68 changes. This change in inductance is detected, as a torque sensor signal, by the I/F circuit 69 of the controller 100 (FIG. 8) and is converted to a torque signal corresponding to the steering torque. Subsequently, the torque signal is sent to the torque calculation section 81 of the microcomputer 80, in which the steering toque is calculated on the basis of the torque signal.

Subsequently, a torque command value corresponding to the calculated steering torque is output to the motor control section 82, which in turn outputs to the drive circuit 83 a control signal corresponding to the torque command value. The drive circuit 83 supplies drive current to the electric motor 50 in accordance with the control signal, so that the electric motor 50 rotates.

Rotation of the electric motor 50 is transmitted to the shaft 75 via the reduction gears 71a and 71b in order to rotate the shaft 75. Thus, rotational torque of the shaft 75, i.e., steering toque, is increased in order to assist the steering operation.

When the torque monitor section 93 or the current monitor section 92 detects an anomalous-state, an anomaly signal is sent to the motor control section 82, in response to which the motor control section 82 stops the issuance of the control signal in order to stop control of the electric motor 50.

However, the controller 100 is configured to determine occurrence of an anomalous-state through only one-time detection of a state in which the difference obtained through the comparison operation of the torque monitor section 93 exceeds a predetermined level, and to stop the control of the electric motor 50 instantaneously after the detection of the anomalous-state.

Therefore, there is a possibility of the control of the electric motor 50 being stopped even when the steering torque value changes due to external noise which enters the electrical system extending from the torque sensing mechanism 60 to the controller 100 or external noise which enters the controller 100 itself.

That is, the conventional controller has a drawback of insufficient reliability in terms of anomalous-state judgment, or a difficulty in properly judging whether the control of the electric motor 50 is truly stopped due to an anomalous-state of the controller 100.

SUMMARY OF THE INVENTION

In view of the foregoing, an object of the present invention is to provide a controller for a motor-driven power steering mechanism which has improved reliability in terms of anomalous-state judgment.

To achieve the above object, the present invention provides a controller for a motor-driven power steering mechanism including a steering mechanism, a steering wheel connected to the steering mechanism, a torque-sensing mechanism for sensing steering torque applied to the steering wheel, and an electric motor for producing an assisting steering torque. The controller comprises a control section for controlling the electric motor on the basis of a control signal corresponding to the steering torque sensed by the torque-sensing mechanism; and an anomalous-state judgment section which receives the control signal output from the control section, determines a degree of continuity of a state in which the control signal assumes an anomalous level, and judges that the control section is anomalous when the determined degree of continuity reaches a predetermined level.

In the controller of the present invention, the degree of continuity of a state in which the control signal assumes an anomalous level is determined, and the control section is judged to be anomalous when the determined degree of continuity reaches a predetermined level, unlike the conventional controller in which the control section is judged to be anomalous immediately upon one-time detection of the control signal having reached a preset value. Therefore, reliability of anomalous-state judgment can be improved.

The anomalous-state judgment section is preferably configured to judge that the control section is anomalous when the number of times the received control signal deviates from an allowable range has reached a predetermined number. Alternatively, the anomalous-state judgment section may be configured to judge that the control section is anomalous when a period of time over which the received control signal falls out of the allowable range has reached a predetermined length.

The control section is advantageously formed of a single microcomputer, and the degree of continuity is determined by means of a digital signal processor. In this case, since the degree of continuity is determined by use of the digital signal processor, production cost of the controller can be reduced as compared with a controller in which the degree of continuity is determined by use of a microcomputer.

Preferably, the degree of continuity is determined on the basis of an average level of the control signal received during a predetermined period of time.

In a configuration such that the difference between a certain maximum value and a subsequent maximum value of the control signal is calculated, and an anomalous-state is judged to occur when the calculated difference exceeds a predetermine value, the difference increases through one-time generation of a large maximum value, resulting in erroneous detection of an anomalous-state. By contrast, in the controller according to the present invention, since the degree of continuity is determined on the basis of an average level of the control signal received during a predetermined period of time, such an erroneous detection can be avoided.

Advantageously, the anomalous-state judgment section comprises an informing device for informing an anomalous-state of the control section detected by the anomalous-state judgment section. Advantageously, the anomalous-state judgment section comprises a control prohibition section for stopping control of the electric motor when the anomalous-state judgment section detects an anomalous-state of the control section.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of a controller for a motor-driven power steering mechanism according to the present invention will be described with reference to the drawings.

Figure 1:
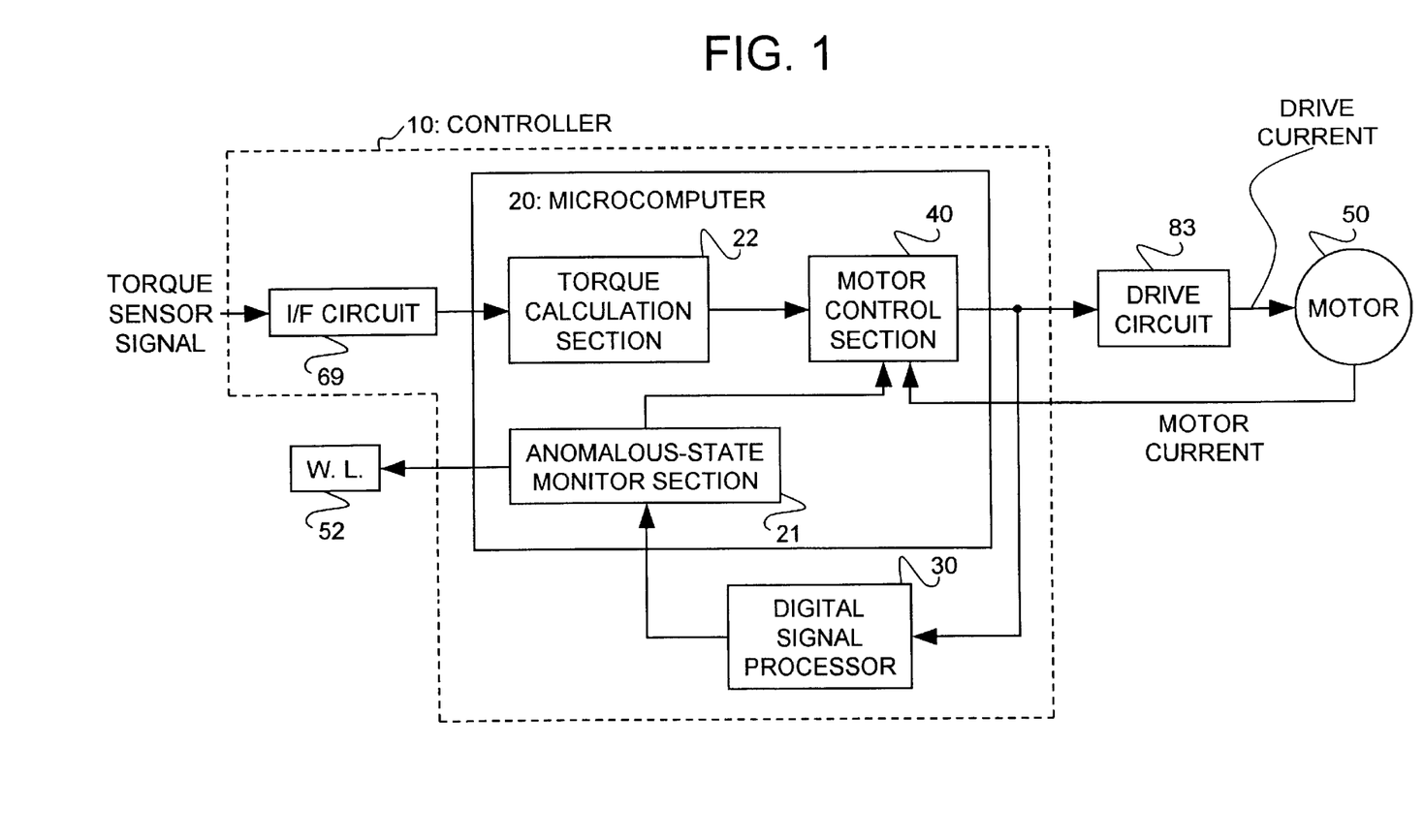
FIG. 1 is a block diagram showing the electrical configuration of a controller for a motor-driven power steering mechanism according to a first embodiment of the present invention.
Figure 2:
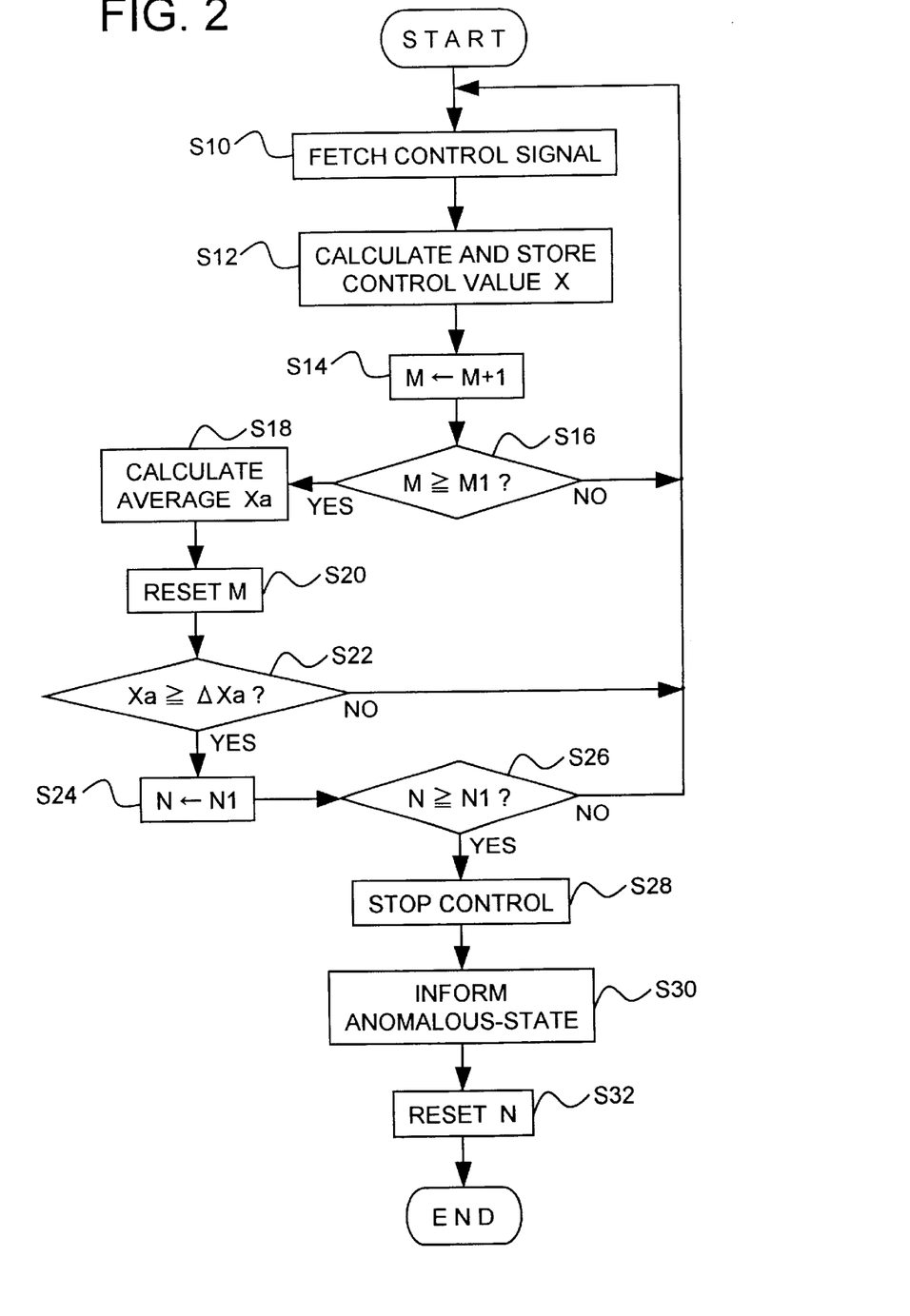
FIG. 2 is a flowchart showing the flow of control performed by the controller of FIG. 1.
Figure 3:
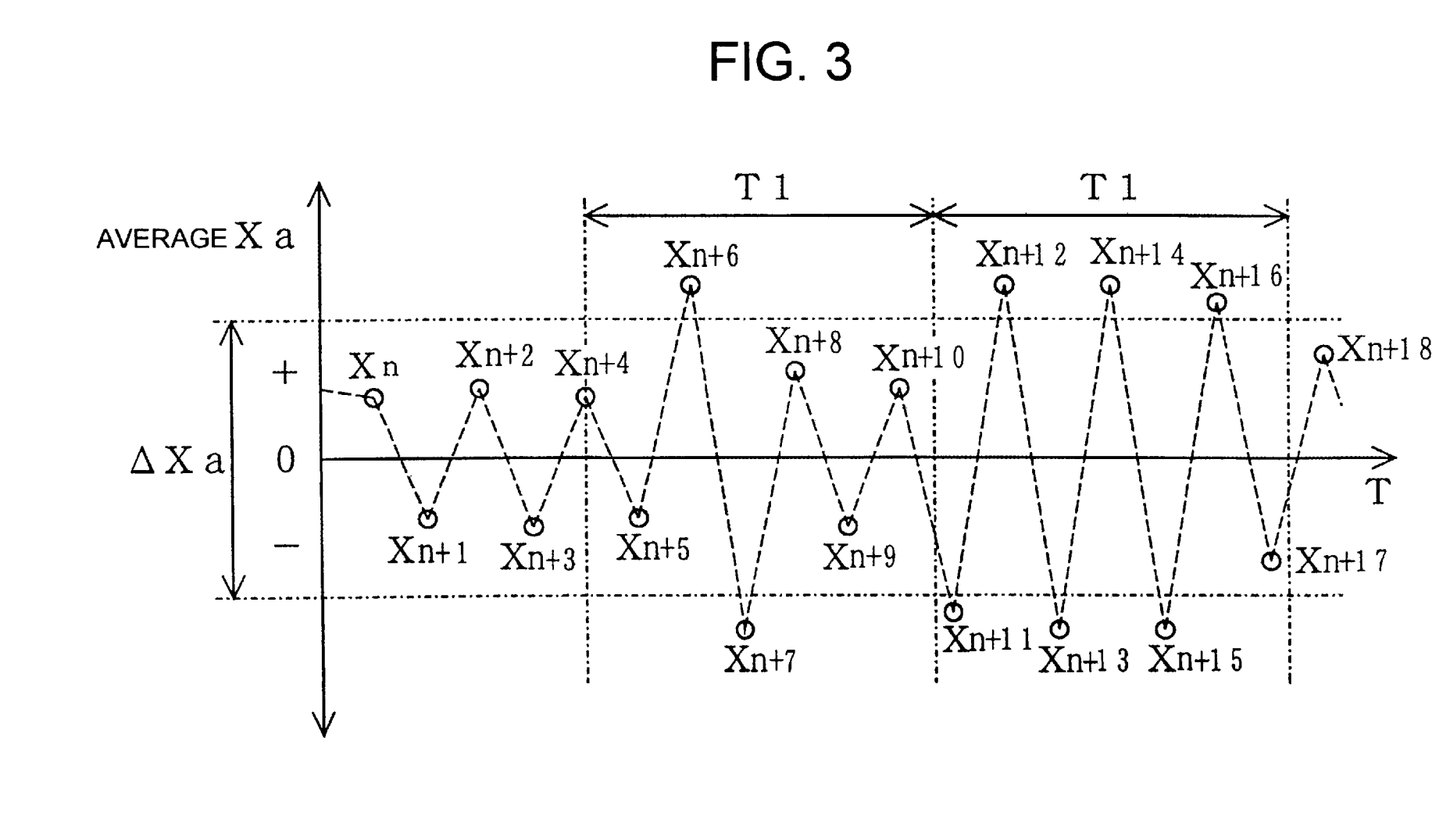
FIG. 3 is an explanatory diagram showing variations in the average of a control signal calculated in a digital signal processor shown in FIG. 1.

FIG. 1 is a block diagram showing the electrical configuration of a controller for a motor-driven power steering mechanism according to a first embodiment of the present invention; FIG. 2 is a flowchart showing the flow of control performed by the controller of FIG. 1; and FIG. 3 is an explanatory diagram showing variations in the averaged value of a control signal calculated in a digital signal processor shown in FIG. 1.

Since the motor-driven power steering mechanism has the same structure as the conventional structure shown in FIGS. 6 and 7, its description will be omitted.

A controller 10 for the motor-driven power steering mechanism includes an IS circuit 69, which receives a torque sensor signal and converts it to a torque signal representing steering torque. A microcomputer 20 is connected to the I/F circuit 69. The microcomputer 20 includes a torque calculation section 22 which receives the torque signal from the I/F circuit 69, calculates the steering torque, and outputs a torque command corresponding to the calculated steering torque. The microcomputer 20 further comprises a motor control section 40 which outputs to a drive circuit 83 a control signal corresponding to the torque command.

The controller 10 further includes a digital signal processor 30. The digital signal processor 30 receives the control signal output from the motor control section 40 and calculates the sum of product of control values represented by the received control signal and outputs a result of the calculation to an anomalous-state monitor section 21 of the microcomputer 20.

Next, flow of control performed by the controller 10 will be described with reference to FIG. 2.

The digital signal processor 30 first fetches the control signal from the motor control section 40 (step, hereinafter simply referred to as "S," 10), calculates a control value X from the fetched control signal; and stores the calculated control value X in a memory area provided therein (S12). Subsequently, the digital signal processor 30 increments by one a calculation number M which is a parameter representing the number of times calculation for obtaining the control value X has been performed (S14), and judges whether the calculation number M has reached a preset calculation number M1 (S16).

That is, until the calculation number M reaches the preset calculation number M1, the digital signal processor 30 repeats the processing for fetching the control signal, calculating a corresponding control value X, and storing the calculated control value X (S10 to S16).

Subsequently, when the calculation number M reaches the preset calculation number M1 (S16: Yes), the digital signal processor 30 calculates an average Xa of the control values X stored in the memory area (S18) and resets the calculation number M (S20). The average Xa of the control values X calculated by the digital signal processor 30 is sent to the anomalous-state monitor section 21 of the microcomputer 20. The anomalous-state monitor section 21 judges whether the average Xa has deviated from an allowable range ΔXa (S22). When the average Xa is judged to have deviated from the allowable range ΔXa (S22: Yes), the anomalous-state monitor section 21 increments by one a deviation-frequency number N indicating the number of times the average Xa deviates from the allowable range ΔXa (S24).

In an exemplary case shown in FIG. 3 in which the anomalous-state monitor section 21 receives, from the digital signal processor 30, $X_n$ to $X_{n+18}$ as averages Xa, the anomalous-state monitor section 21 increments by one the deviation-frequency number N upon receipt of $X_{n+6}$ and $X_{n+7}$, both of which fall out of the allowable range ΔXa (S24).

When the deviation-frequency number N is judged to have reached or exceeded a preset number N1 (S26: Yes), the anomalous-state monitor section 21 sends a control prohibition command to the motor control section 40 (S28).

In an exemplary case of N1=8, the deviation-frequency number N reaches the preset number N1 when the anomalous-state monitor section 21 has received $X_{n+6}$, $X_{n+7}$, and $X_{n+11}$–$X_{n+16}$, all of which fall out of the allowable range ΔXa as shown in FIG. 3, upon which the anomalous-state monitor section 21 sends the control prohibition command to the motor control section 40 (S28).

That is, when the average Xa of the control values X repeatedly deviates from the allowable range ΔXa, there is a high probability that the controller 10 is in an anomalous-state. In this case, the control prohibition command is sent to the motor control section 40 (S28).

Upon receipt of the control prohibition command, the motor control section 40 stops issuance of the control signal to the drive circuit 83 in order to stop drive of the electric motor 50.

Subsequently, the anomalous-state monitor section 21 outputs an anomalous-state informing signal to a warning lamp 52 provided on an instrument panel of a vehicle (S30). As a result, the warning lamp 52 is turned on or caused to blink, in order to inform the driver of the anomalous-state of the controller 10.

Subsequently, the anomalous-state monitor section 21 resets the deviation frequency number N (S32) and ends the processing.

As described above, use of the controller 10 according to the first embodiment enables the control of the electric motor 50 to be stopped when the deviation-frequency number—which represents the number of times the average Xa of the control values X of the control signal output from the motor control section 40 deviates from the allowable range ΔXa—has reached the preset number N1.

Accordingly, control of the electric motor 50 is not stopped immediately upon one-time detection of the control value having reached the preset value as in the case of the conventional controller. Thus, reliability of anomalous-state judgment is improved.

Further, only one minicomputer is needed, with the result that production cost can be decreased as compared with the conventional controller, which requires two microcomputers.

Further, whereas the conventional controller requires two signal paths for connecting the I/F circuit 69 with the microcomputers 80 and 90, respectively, the controller 10 according to the first embodiment of the present invention requires only one signal path for connecting the I/F circuit 69 with the microcomputer 20, thereby simplifying the circuit configuration, resulting in improved reliability of the controller 10.

In the above-described control, the deviation-frequency number N is incremented even when the average Xa deviates from the allowable range ΔXa intermittently as opposed to continuously. However, the control may be modified such that the deviation frequency number N is incremented only when the average Xa deviates from the allowable range ΔXa continuously, and when the deviation-frequency number N reaches the preset number N1, control of the electric motor 50 is stopped.

Next, a controller for a motor-driven power steering mechanism according to a second embodiment of the present invention will be described with reference to FIG. 4.

The controller according to the second embodiment is characterized in that control of the electric motor is stopped when the number of times the average Xa of the control values X deviates from the allowable range ΔXa has reached the preset number N1 within a predetermined period of time.

Figure 4:
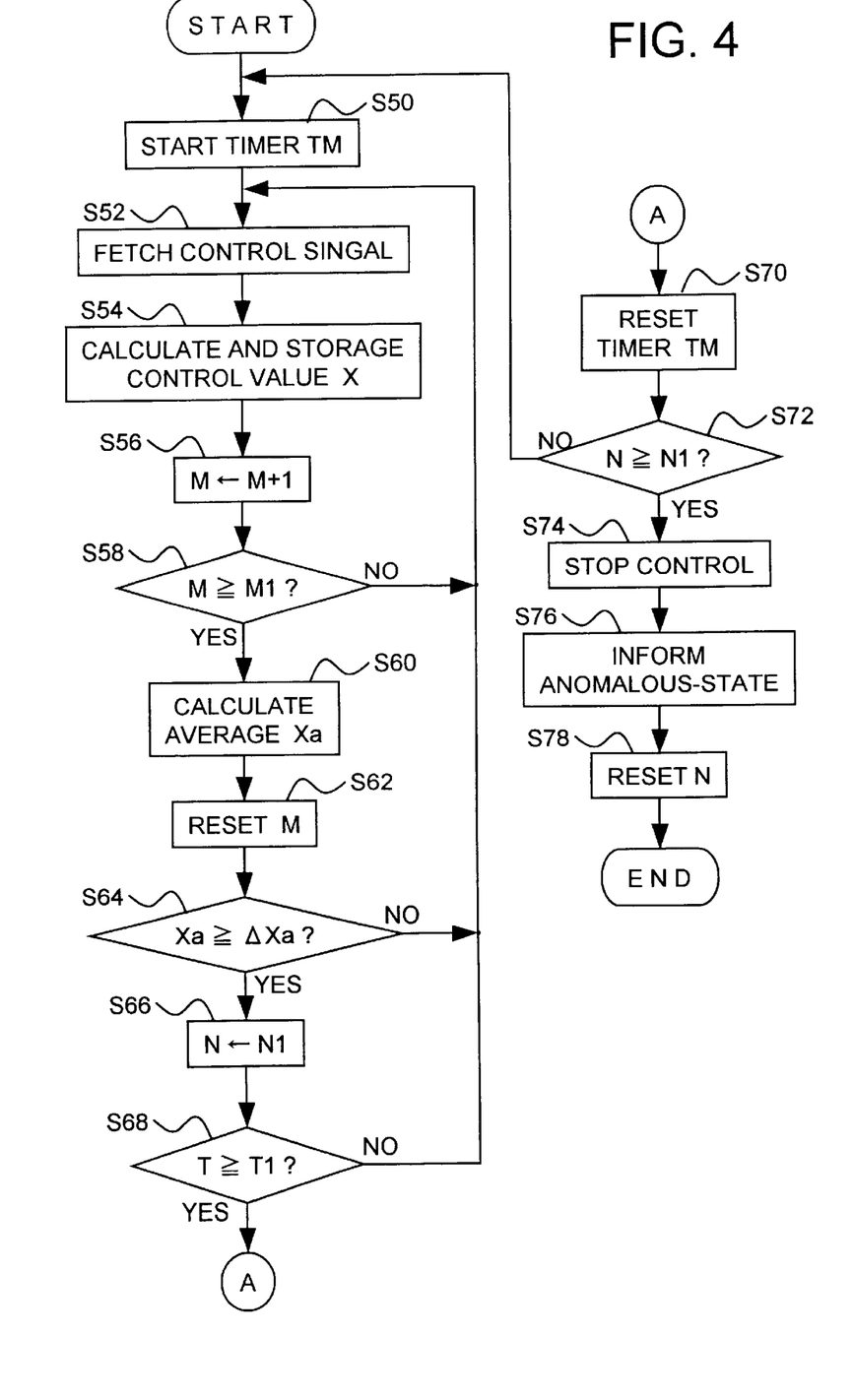
FIG. 4 is a flowchart showing the flow of control performed by a controller according to a second embodiment of the present invention.

FIG. 4 is a flowchart showing the flow of control performed by a controller according to the second embodiment Since the controller of the present embodiment is identical with the controller of the first embodiment with the exception of the control flow shown in FIG. 4, descriptions for the identical portions will be omitted.

First, a timer TM (not shown) built in the microcomputer 20 is started (S50). Subsequently, the digital signal processor 30 first fetches the control signal from the motor control section 40 (S52), calculates a control value X from the fetched control signal, and stores the calculated control value X in a memory area provided therein (S54). Subsequently, the digital signal processor 30 increments by one a calculation number M, which is a parameter representing the number of times calculation for obtaining the control value X has been performed (S56), and judges whether the calculation number M has reached a preset calculation number M1 (S5S).

That is, until the calculation number M reaches the preset calculation number M1, the digital signal processor 30 repeats the processing for fetching the control signal, calculating a corresponding control value X and storing the calculated control value X (S52 to S58).

Subsequently, when the calculation number M reaches the preset calculation number M1 (S58: Yes), the digital signal processor 30 calculates an average Xa of the control values X stored in the memory area (S60) and resets the calculation number M (S62). The average Xa of the control values X calculated by the digital signal processor 30 is sent to the anomalous-state monitor section 21 of the microcomputer 20. The anomalous-state monitor section 21 judges whether the average Xa has deviated from an allowable range ΔXa (S64). When the average Xa is judged to have deviated from the allowable range ΔXa (S64: Yes), the anomalous-state monitor section 21 increments by one a deviation-frequency number N indicating the number of times the average Xa deviates from the allowable range ΔXa (S66).

Subsequently, the microcomputer 20 judges whether a time T counted by the timer TM has reached a preset time T1 (S68). Until the time T is judged to have reached the preset time T1, the processing for fetching the control signal and calculating the average Xa of the control values X of the control signal is repeated (S52 to S68).

When the time T counted by the timer TM has reached the preset time T1 (S68: Yes), the timer TM is reset (S70), and when the deviation-frequency number N is judged to have reached or exceeded a preset number N1 (S72: Yes), the anomalous-state monitor section 21 sends a control prohibition command to the motor control section 40 (S74)In In an exemplary case of N1=6, the deviation-frequency number N reaches the preset number N1 during the second period P2 in FIG 3, during which $X_{n+11}-X_{n+16}$ are calculated as averages Xa, because $X_{n+11}-X_{n+16}$ all fall out of the allowable range ΔXa as shown in FIG. 3. In this case, the anomalous-state monitor section 21 sends the control prohibition command to the motor control section 40 (S74).

That is, when the average Xa of the control values X repeatedly deviates from the allowable range ΔXa within the preset period of time T1, there is a high probability that the controller 10 is in an anomalous-state. Therefore, the control prohibition command is sent to the motor control section 40 (S74).

Upon receipt of the control prohibition command, the motor control section 40 stops issuance of the control signal to the drive circuit 83 in order to stop drive of the electric motor 50.

Subsequently, the anomalous-state monitor section 21 outputs an anomalous-state informing signal to the warning lamp 52 provided on the instrument panel of the vehicle (S76). As a result, the warning lamp 52 is turned on or caused to blink, in order to inform the driver of the anomalous-state of the controller 10.

Subsequently, the anomalous-state monitor section 21 resets the deviation frequency number N (S78) and ends the processing.

As described above, use of the controller 10 according to the second embodiment enables control of the electric motor 50 to be stopped when the deviation-frequency number—which represents the number of times the average Xa of the control values X of the control signal output from the motor control section 40 deviates from the allowable range ΔXa—has reached the preset number N1 within the preset period of time T1.

Accordingly, control of the electric motor 50 is not stopped immediately upon one-time detection of the control value having reached the preset value as in the case of the conventional controller. Thus, reliability of anomalous-state judgment is improved.

Further, since only one minicomputer is needed, production cost can be decreased as compared with the conventional controller, which requires two microcomputers.

Further, whereas the conventional controller requires two signal paths for connecting the I/F circuit 69 with the microcomputers 80 and 90, respectively, the controller 10 according to the second embodiment of the present invention requires only one signal path for connecting the I/F circuit 69 with the microcomputer 20, thereby simplifying the circuit configuration.

In the above-described control, the deviation-frequency number N is incremented even when the average Xa deviates from the allowable range ΔXa intermittently, as opposed to continuously, within the preset period of time T1. However, the control may be modified such that the deviation-frequency number N is incremented only when the average Xa deviates from the allowable range ΔXa continuously within the preset period of time T1, and when the deviation-frequency number N reaches the preset number N1, control of the electric motor 50 is stopped.

Figure 5:
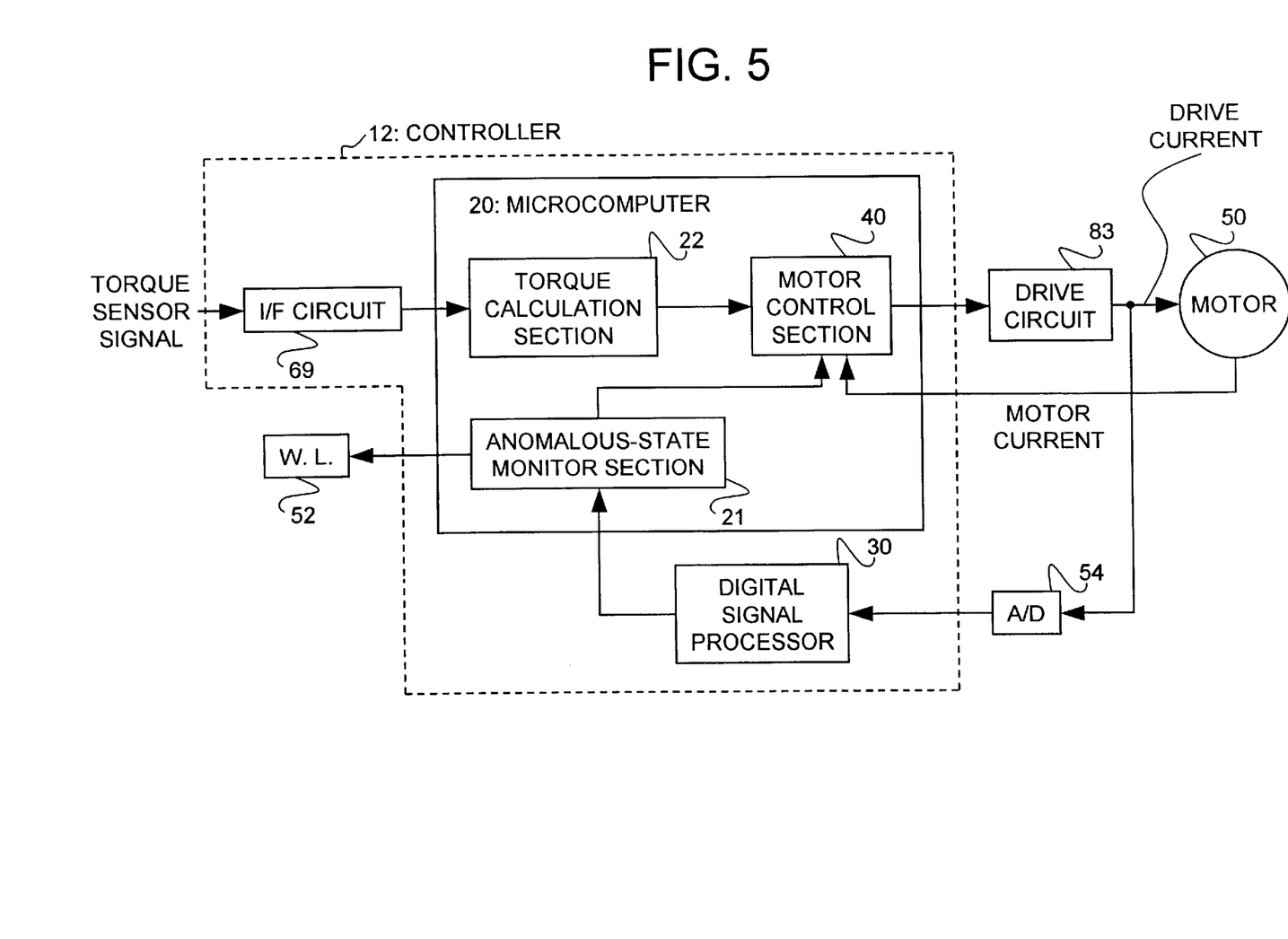
FIG. 5 is a block diagram showing the electrical configuration of a controller according to a third embodiment the present invention.

FIG. 5 shows a controller 12 according to a third embodiment of the present invention. In the controller 12, instantaneous ma des of drive current supplied from the drive circuit 83 to the electric motor 50 are converted into digital signals by use of an A/D conversion circuit 54, and the digital signals are sent to the digital signal processor 30, which calculates an average of the digital signals.

Further, in the first and second embodiments, the number of times the average Xa of the control values X of the control signal deviates from the allowable range ΔXa is counted. However, there may be employed a scheme of counting the number of times the maximum or minimum value of the control values X deviates from the allowable range ΔXa.

Further, there may be employed weighting means which provides a weight corresponding to the magnitude of steering torque, through, for example, an operation for changing the allowable range ΔXa with the magnitude of steering torque.

Moreover, the digital signal processor 30 may be configured to provide the function of the anomalous-state monitor section 21.

The torque calculation section 22 and the motor control section 40 correspond to the control section of the present invention; and the digital signal processor 30 and the anomalous-state monitor section 21 correspond to the anomalous-state judgment section of the present invention. Also, the warning lamp 52 corresponds to the informing section of the present invention.

In an actual controller, the anomalous-state monitor section 21, the torque calculation section 22, and the motor control section 40 of the microcomputer 20 is realized by means of a control program stored in an unillustrated memory device of the microcomputer 20.

Further, the processing of steps S10 to S26 in FIG. 2 and the processing of steps S50 to S72 in FIG. 4 each function as the anomalous-state judgment section of the present invention; step S28 in FIG. 2 and step S74 in FIG. 4 each function as the control prohibition section of the present invention; and step S30 in FIG. 2 and step S76 in FIG. 4 each function as the informing section of the present invention.

Obviously, numerous modifications and variations of the present invention are possible in light of the above teachings. It is therefore to be understood that within the scope of the appended claims, the present invention may be practiced otherwise than as specifically described herein.

What is claimed is:

1. A controller for a motor-driven power steering mechanism including a steering mechanism, a steering wheel connected to the steering mechanism, a torque-sensing mechanism for sensing steering torque applied to the steering wheel, and an electric motor for producing an assisting steering torque, the controller comprising:

a control section for controlling the electric motor on the basis of a control signal corresponding to the steering torque sensed by the torque-sensing mechanism;

an anomalous-state judgment section which receives the control signal output from the control section, determines a degree of continuity of a state in which the control signal assumes an anomalous level, and judges that the control section is anomalous when the determined degree of continuity reaches a predetermined level; and wherein the anomalous-state judgment section comprises a control prohibition section for stopping control of the electric motor when the anomalous-state judgment section detects an anomalous-state of the control section.

2. A controller for a motor-driven power steering mechanism according to claim 1, wherein the control section is formed of a single microcomputer, and the degree of continuity is determined by means of a digital signal processor.

3. A controller for a motor-driven power steering mechanism according to claim 1, wherein the degree of continuity is determined on the basis of an average level of the control signal received during a predetermined period of time.

4. A controller for a motor-driven power steering mechanism according to claim 1, wherein the anomalous-state judgment section comprises an informing device for informing an anomalous-state of the control section detected by the anomalous-state judgment section.

5. A controller for a motor-driven power steering mechanism including a steering mechanism, a steering wheel connected to the steering mechanism, a torque-sensing mechanism for sensing steering torque applied to the steering wheel, and an electric motor for producing an assisting steering torque, the controller comprising:

a control section for controlling the electric motor on the basis of a control signal corresponding to the steering torque sensed by the torque-sensing mechanism;

an anomalous-state judgment section which receives the control signal output from the control section, determines a degree of continuity of a state in which the control signal assumes an anomalous level, and judges that the control section is anomalous when the determined degree of continuity reaches a predetermined level; and wherein the anomalous-state judgment section judges that the control section is anomalous when the number of times the received control signal deviates from an allowable range has reached a predetermined number.

6. A controller for a motor-driven power steering mechanism according to claim 5, wherein the control section is formed of a single microcomputer, and the degree of continuity is determined by means of a digital signal processor.

7. A controller for a motor-driven power steering mechanism according to claim 5, wherein the degree of continuity is determined on the basis of an average level of the control signal received during a predetermined period of time.

8. A controller for a motor-driven power steering mechanism according to claim 5, wherein the anomalous-state judgment section comprises an informing device for informing an anomalous-state of the control section detected by the anomalous-state judgment section.

9. A controller for a motor-driven power steering mechanism according to claim 5, wherein the anomalous-state judgment section comprises a control prohibition section for stopping control of the electric motor when the anomalous-state judgment section detects an anomalous-state of the control section.

10. A controller for a motor-driven power steering mechanism including a steering mechanism, a steering wheel connected to the steering mechanism, a torque-sensing mechanism for sensing steering torque applied to the steering wheel, and an electric motor for producing an assisting steering torque, the controller comprising:

a control section for controlling the electric motor on the basis of a control signal corresponding to the steering torque sensed by the torque-sensing mechanism, an anomalous-state judgment section which receives the control signal output from the control section, determines a degree of continuity of a state in which the control signal assumes an anomalous level, and judges that the control section is anomalous when the determined degree of continuity reaches a predetermined level, and wherein the anomalous-state judgment section judges that the control section is anomalous when the number of times the received control signal deviates from an allowable range has reached a predetermined number within a predetermined time period.

11. A controller for a motor-driven power steering mechanism according to claim 10, wherein the control section is formed of a single microcomputer, and the degree of continuity is determined by means of a digital signal processor.

12. A controller for a motor- driven power steering mechanism according to claim 11, wherein the degree of continuity is determined on the basis of an average level of the control signal received during a predetermined period of time.

13. A controller for a motor-driven power steering mechanism according to claim 12, wherein the anomalous-state judgment section comprises an informing device for informing an anomalous-state of the control section detected by the anomalous-state judgment section.

* * * * *